United States Patent
Espindola et al.

[11] Patent Number: 6,102,582
[45] Date of Patent: Aug. 15, 2000

[54] ARTICLE COMPRISING CONTROLLABLE OPTICAL CONNECTORS

[75] Inventors: Rolando Patricio Espindola, Chatham; Sungho Jin, Millington; Hareesh Mavoori, Berkeley Heights, all of N.J.

[73] Assignee: Lucent Technologies Inc., Murray Hill, N.J.

[21] Appl. No.: 09/157,967

[22] Filed: Sep. 21, 1998

[51] Int. Cl.[7] ........................................ G02B 6/38
[52] U.S. Cl. .................... 385/57; 385/15; 385/16; 385/22; 385/52; 385/140
[58] Field of Search ............................. 385/15, 16, 17, 385/20, 21, 22, 23, 25, 52, 53–57, 140, 14, 95, 97, 98

[56] References Cited

U.S. PATENT DOCUMENTS

| | | | |
|---|---|---|---|
| 4,636,032 | 1/1987 | Grego | 385/57 X |
| 4,688,885 | 8/1987 | Poteat et al. | 385/57 X |
| 4,834,488 | 5/1989 | Lee | 385/57 X |
| 5,127,084 | 6/1992 | Takahashi | 385/140 |
| 5,261,015 | 11/1993 | Glasheen | 385/23 |
| 5,606,635 | 2/1997 | Haake | 385/53 |
| 5,727,099 | 3/1998 | Harman | 385/52 |
| 5,864,643 | 1/1999 | Pan | 385/33 |

*Primary Examiner*—Brian Healy
*Attorney, Agent, or Firm*—Mathews, Collins, Shepherd & Gould, P.A.

[57] ABSTRACT

In accordance with the invention, a device for controlling alignment between two optical devices comprises a mobile magnet attached to a mobile optical device and a plurality of programmable magnets for moving the mobile magnet (and attached optical device) in relation to a second optical device. In preferred embodiments, the programmable magnets are latchable.

12 Claims, 7 Drawing Sheets

FIG. 9 ptical connectors and, in particular, to magnetically controllable connectors with on-axis and off-axis movement of components for alignment or deliberate misalignment of optical path. Such devices are useful for aligning optical components for maximum optical coupling, for shifting of optical routes, or for misaligning components for attenuation.

BACKGROUND OF THE INVENTION

Communication systems employing optical fibers— particularly WDM systems—are among the most promising systems for achieving high data rate telecommunications. Basically, optical fibers are thin strands of glass capable of transmitting optical signals containing large amounts of information over long distances with very low loss. In essence, an optical fiber is a small diameter waveguide comprising a core having a first index of refraction surrounded by a cladding having a second (lower) index of refraction. Typical optical fibers are made of high purity silica with minor concentrations of dopants to control the index of refraction.

Connectors are important components in optical fiber communication systems. With the increasing use of optical fibers and associated optoelectronic devices such as lasers, light-emitting-diodes (LEDs), photodetectors, and planar waveguide devices, there is an increasing need for reliable optical connectors, optical switches, and aligners. The precision alignment of optical paths, either permanent or reconfigurable, between two mating devices is essential for maximum optical coupling efficiency. For example, in the interconnection of a single mode optical fiber, the alignment tolerance must be on the order of a few micrometers or less.

There is also a need for devices which can introduce precise, controllable misalignment of optical paths. Such devices can be used to attenuate lightwave signals. Variable optical attenuators are increasingly important in dense wavelength-division multiplexing (DWDM) optical fiber transmission systems. Variable attenuators are used to vary the amount of loss light experiences as it passes through the device, typical losses range from low loss (<1 dB) to very high loss (>30 dB). The loss mechanism for variable attenuators can be coupling loss between fibers, polarization loss, absorption loss, scattering loss, or any combination of these.

A variable attenuator based on coupling loss is typically composed of two fibers whose separation is mechanically controlled. As the separation between fibers increases, the amount of loss also increases (see for example, Benner et al, "Low-reflectivity in-line variable attenuator utilizing optical fiber tapers," *J. Lightwave Technol.*, Vol 18, p 7, 1990). Variable attenuators based on polarization loss are composed of GRIN lenses to collimate light from the fiber, a plate or cell to rotate the polarization of the light, and a polarizer to introduce loss. See for example, U.S. Pat. No. 5,727,109 issued to Jing-Jong Pan et al. on Mar. 10, 1998. In-line variable optical attenuators using magnetically controlled displacement are disclosed in U.S. patent application Ser. No. 09/097,549 entitled "Magnetically Controlled Variable Optical Attenuation", filed by Espindola et al. on Jun. 15, 1998.

While it is possible to obtain the alignment of optical devices mechanically, e.g., by using a motor or gear device, the inherent slow operation and mechanical relaxation in such devices are significant drawbacks. It is desirable to have the alignment or optical switching carried out swiftly with minimal relaxation. It is also desirable to have alignment control in two or three directions, not confined alignment in a single direction. Accordingly there is a need for optical connectors which can provide rapid alignment or controlled misalignment.

SUMMARY OF THE INVENTION

In accordance with the invention, a device for controlling alignment between two optical devices comprises a mobile magnet attached to a mobile optical device and a plurality of programmable magnets for moving the mobile magnet (and attached optical device) in relation to a second optical device. In preferred embodiments, the programmable magnets are latchable.

BRIEF DESCRIPTION OF THE DRAWINGS

The advantages, nature and additional features of the invention will appear more fully upon consideration of the illustrative embodiments described in the accompanying drawings. In the drawings.

It is to be understood that these drawings are for purposes of illustrating the concepts of the invention and are not to scale.

DETAILED DESCRIPTION

Figure 1A:
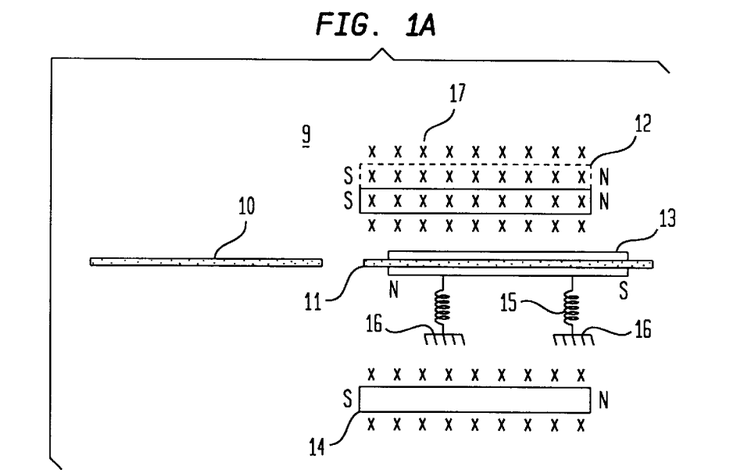
FIGS. 1(a), 1(b) and 1(c) schematically illustrate exemplary optical connectors with a three-dimensional alignment control.

Referring to the drawing, FIG. 1(a) is a side view of a three-dimensionally alignable optical connector 9. Two optical components, here optical fibers 10 and 11, are aligned or deliberately misaligned by using magnetic attractive or repulsive forces among magnetic components 12, 13, and 14. The fiber 10 is fixed onto a substrate (not shown) and hence is immobile. The fiber 11 is attached to one or more mobile magnetic components 13 and hence is mobile. Fiber 11 is also temporarily confined by one or more springs 15 connected to a substrate 16. The mobile magnet 13 can be made of a soft magnetic material (such as permalloy, silicon steel, or vanadium permendur), a semi-hard magnetic material (such as Fe—Cr—Co, Fe—Mn or Fe—Co—V), or a permanent magnetic material (such as Sm—Co, Nd—Fe—B, or hexaferrite).

The mobile magnet 13 attached to the mobile fiber 11 is moved by magnetic attraction to (or repulsion from) three immobile and programmable magnets 12 which are placed with their magnetic poles close to those of the mobile magnet 13. Each of the programmable magnets 12 is independently magnetizable or latchable to a different magnetic strength, as by passing a different level of current to the windings of a solenoid 17. If the fibers 10 and 11 are located at an equal distance from the three programmable magnets and if all three are magnetized to the same strength, then the mobile fiber 11 will be moved in such a way that will be approximately centered and aligned with the stationary fiber 10. If the three programmable magnets 12 are magnetized to unequal strengths, then the mobile magnet 13 (and the attached fiber 11) will move closer to the strongest of the three. If one (or more) of the programmable magnets 12 is demagnetized (as by a gradually diminishing AC field) or magnetized in reverse polarity, the mobile magnet 13 will be pushed away by magnetic repulsion and move even closer to the other programmable magnet(s). If the programmable magnets 12 are magnetized to an increased equal strength, the mobile magnet 13 and the attached fiber 11 can be pulled closer toward the immobile fiber 10 for increased optical coupling. If the magnetic strength of the programmable magnets 12 is equally reduced, the mobile magnet 13 will be pulled back by the attached spring(s). Therefore, control of the magnetization in programmable magnets 12, permits the two fibers 10 and 11 to be relatively moved to any desired position in a controlled manner along x-, y-, and z-directions so as to align, slightly misalign (e.g., to attenuate the optical signals), or to completely misalign (e.g., to switch off) the optical paths. While components 10 and 11 in this embodiment are optical fibers, the same structure can be used with other optical components such lasers, LEDs, photodetectors and planar waveguide devices.

Figure 1B:
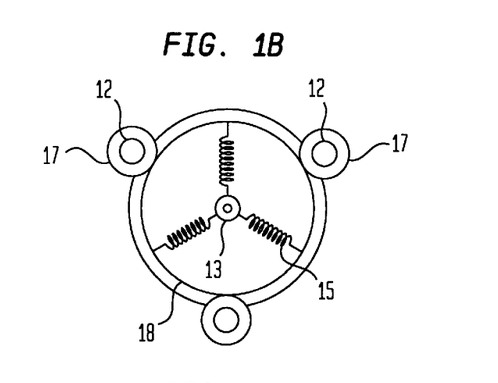
Figure 1C:
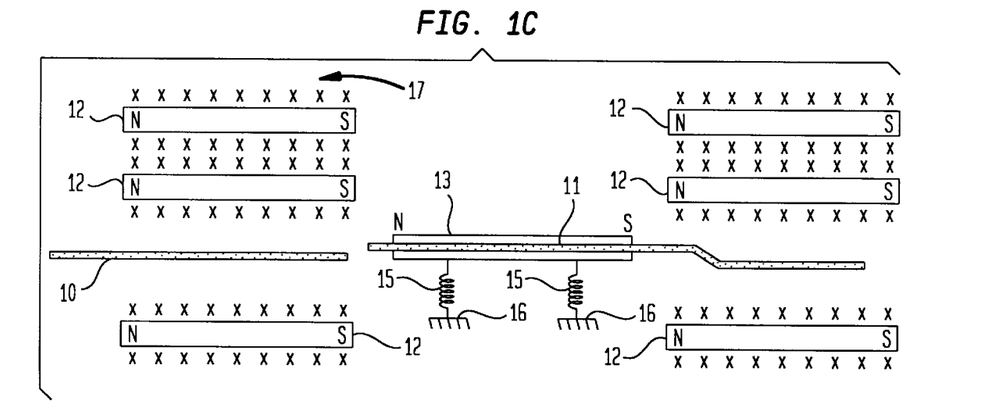

FIGS. 1(*b*) and 1(*c*) show variations of the FIG. 1(*a*) device. In FIG. 1(*b*), the mobile magnet 13 is spring suspended within a support tube 18. In FIG. 1(*c*), the programmable magnets 12 and mobile magnet 13 are longitudinally spaced apart. In each instance, programmable magnets 12 and solenoids 17 are utilized to control the x, y or z position as well as the tilting of the mobile fiber 11. A light broadening element (such as GRIN lens (not shown)) may optionally be added between the fibers 10 and 11 for the ease of optical coupling.

Figure 2A:
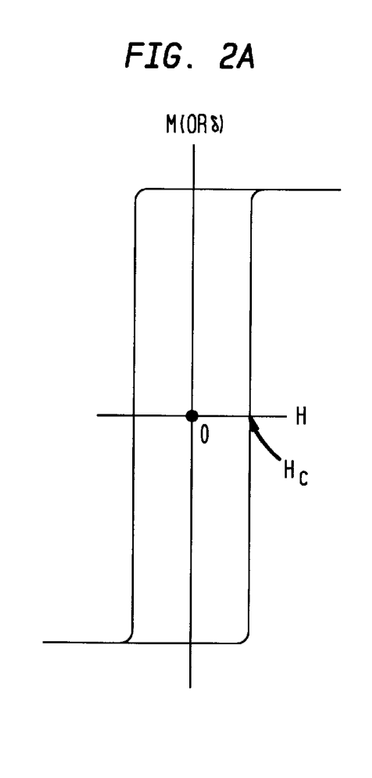
FIGS. 2(a)–(c) are schematic graphical representations of magnetization M (or displacement δ) vs. applied field curve for a latchable magnet.
Figure 2B:
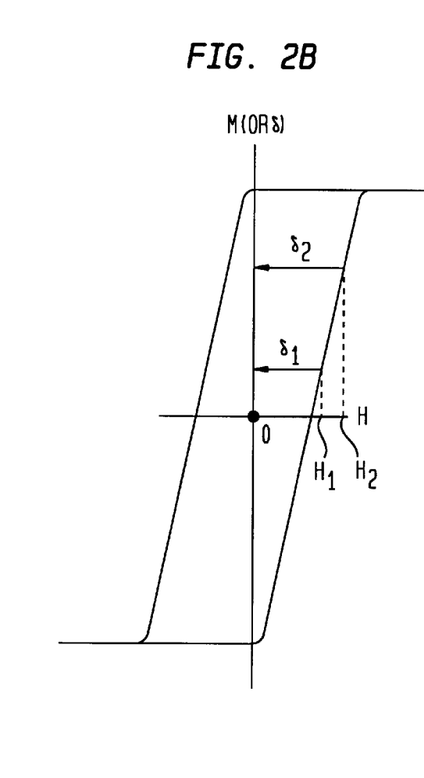
Figure 2C:
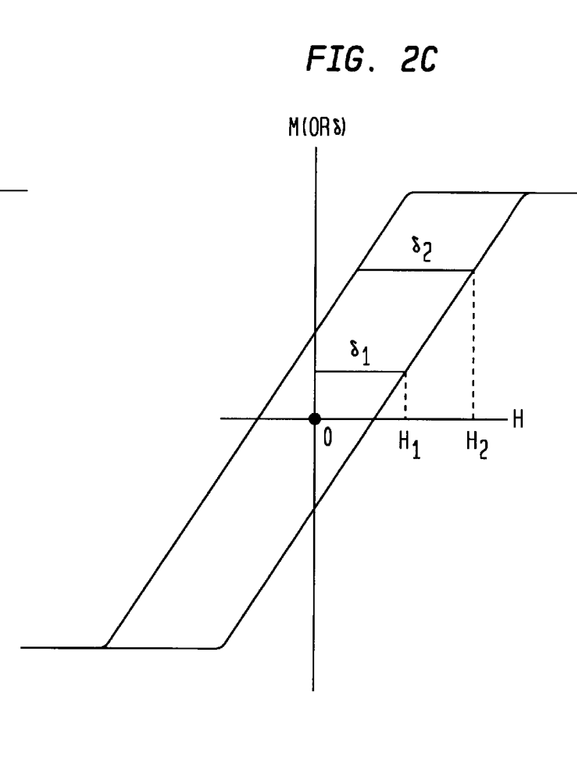

FIGS. 2(*a*)–2(*c*) show M-H loop characteristics useful in understanding the latchable operation of the device. The programmable magnets 12 which are controlled by the solenoids 17 can be magnetically soft for temporary alignment of the fibers, however, it is preferred that they have a relatively square M-H magnetization hysteresis loop so that the optical alignment is latchable even after the electric power to the solenoids is removed. With magnets exhibiting a square hysteresis loop, one can make bistable devices that switch between two magnetization (or fiber displacement) levels, e.g., a base fiber position corresponding to zero magnetic force and a saturation displacement position achieved with the maximum magnetic force. The zero magnetic force is achieved by applying an AC or DC demagnetizing field. The maximum (saturation) displacement is achieved by a DC pulse current sufficient to saturate the magnets. However, for a continuous tuning of the mobile fiber position in any x, y or z direction, the square loop characteristic is not always desirable as the steep side of the curve in FIG. 2(*a*) can pose a control problem when a certain intermediate fiber displacement ($\delta$) is desired. For ease of control, the M-H and $\delta$-H loop can be skewed as shown in FIG. 2(*b*). This is achieved by increasing the self-demagnetizing field of the magnets, e.g., by either increasing effective diameter of the magnet or reducing the length and thus decreasing the magnet length-to-diameter aspect ratio. The optimal skewing of the loop is as illustrated in FIG. 2(*b*), i.e., the remanent magnetization or the remanent mobile fiber displacement when the applied field is removed is still essentially the same as the saturation value (at least 90%), and the onset field of rapid decrease of M or $\delta$ when the field is reversed is near zero field and preferably in the range of ±50% of the coercive force, even more preferably in the range of ±10% of the coercive force ($H_c$). In other words, the desired degree of skewing of the loop is preferably a maximum loop shift by 50%–150% of $H_c$. An excessive skewing of the M-H or $\delta$-H loop as shown in FIG. 2(*c*) is not desirable as this causes a deterioration of the latchability of the fiber displacement. Such a deterioration in latchable displacement is indicated by arrows in FIG. 2(*c*).

As an example of intentional loop skewing, an Fe-28%Cr-7%Co alloy is deformation-aged to yield a square M-H loop with $H_c$ of 70 Oe, a dimension of 0.180" diameter and 4" length. The M-H loop is skewed by ~60 Oe, producing a M-H loop similar to FIG. 2(*b*).

For applied magnetic fields of $H_1$ and $H_2$, the corresponding magnetization is latchably retained after the field is removed, and the corresponding displacement of the mobile fiber, $\delta_1$ and $\delta_2$, is also latchably retained. Therefore the device can be operated after actuation, without continuous power. The degree of fiber displacement is altered and latched by changing the magnetization in the programmable magnets. This can be achieved by increasing the applied field by reversing the field or by demagnetizing first and remagnetizing to a new level. The combination of the interaction distances e.g., $\delta_1$, $\delta_2$, and $\delta_3$ by the three programmable magnets and the mobile magnet determines the final, relative alignment position of the two fibers. For magnetization of the magnets using a solenoid, a pulse field (a pulse current in the solenoid) can conveniently be used for high-speed, low-power operation of the devices. The desired duration or speed of the pulse field is typically in the range of $10-10^{-6}$ seconds, preferably $10-10^{-4}$ seconds. The shape of the current pulse applied can be sinusoidal, rectangular or irregular.

The preferred programmable magnet materials for the alignable and latchable connector devices are those whose magnetic properties are modifiable by a pulse magnetic field. Some examples of suitable magnets are Fe—Cr—Co, Fe—Al—Ni—Co (Alnico), Cu—Ni—Fe (Cunife), and Co—Fe—V (Vicalloy). The desired range of the coercivity for the programmable magnet is typically below 500 Oe and preferably below 100 Oe for the ease of programming by re-magnetization using solenoid pulse field. The coercivity is typically above 10 Oe and preferably above 30 Oe for maintaining the stability of the remanent magnetization and also for stability against demagnetization due to stray magnetic fields. For satisfactory latchability of the movement of the mobile magnet when the field is removed, the programmable magnet should have a square magnetization hysteresis loop with the squareness ratio (remanent magnetization/ saturation magnetization) of at least 0.85, preferably at least 0.90, even more preferably at least 0.95. For ease of control, the loop is desirably skewed by at least 50% of $H_c$. Mechanically ductile and easily formable or machineable magnet alloys such as Fe—Cr—Co, Cu—Ni—Fe, Co—Fe—V are particularly desirable for shaping into rod-like geometry as shown in FIG. 1. Stable permanent magnets with high coercive forces (e.g., $H_c$>1000 Oe), such as Sm—Co or Nd—Fe—B are less desirable (unless modified to exhibit lower coercive forces) because of the difficulty in reprogramming the remanent magnetization using desirably low magnetic field. A non-programmable magnet, however, can be used as a mobile magnet, in combination with stationary programmable magnets.

Figure 3:
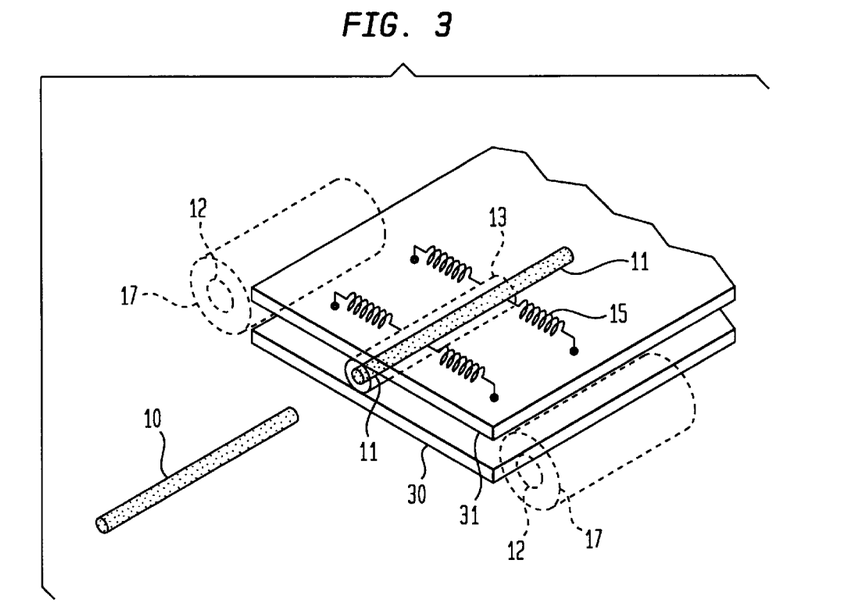
FIG. 3 is an exemplary, laterally adjustable optical connector.

The number of programmable magnets can be one, two, three or even more depending on the nature of the device. In general, three programmable magnets or more are preferred in order to provide three dimensional movement of the mobile fiber. However, if spring components or two-dimensional confinement are utilized, then fewer than three programmable magnets can be used. In FIG. 3, the mobile fiber 11 is confined between two precisely spaced surfaces such as flat plates 31, 32. The plates are preferably provided with low-friction surfaces as by coating with diamond-like carbon or teflon. Since only x and y direction movement is allowed, two programmable magnets 12 are sufficient. The solenoid 17 for each programmable magnet is optionally subdivided axially into two independently operable sections to control the axial movement of the mobile fiber. Optionally, one of the programmable magnets can be replaced by one or more well-balanced springs.

For the alignment devices illustrated in FIGS. 1 and 3, a feedback system (not shown) can optionally be utilized to indicate the degree of precise alignment. Such information can then be fed to the solenoids to activate additional or reduced current to one or more of the solenoids so as to obtain a revised fiber displacement level. This feedback and adjustment process can be repeated until the desired optical alignment or intentional misalignment is achieved.

Figure 4:
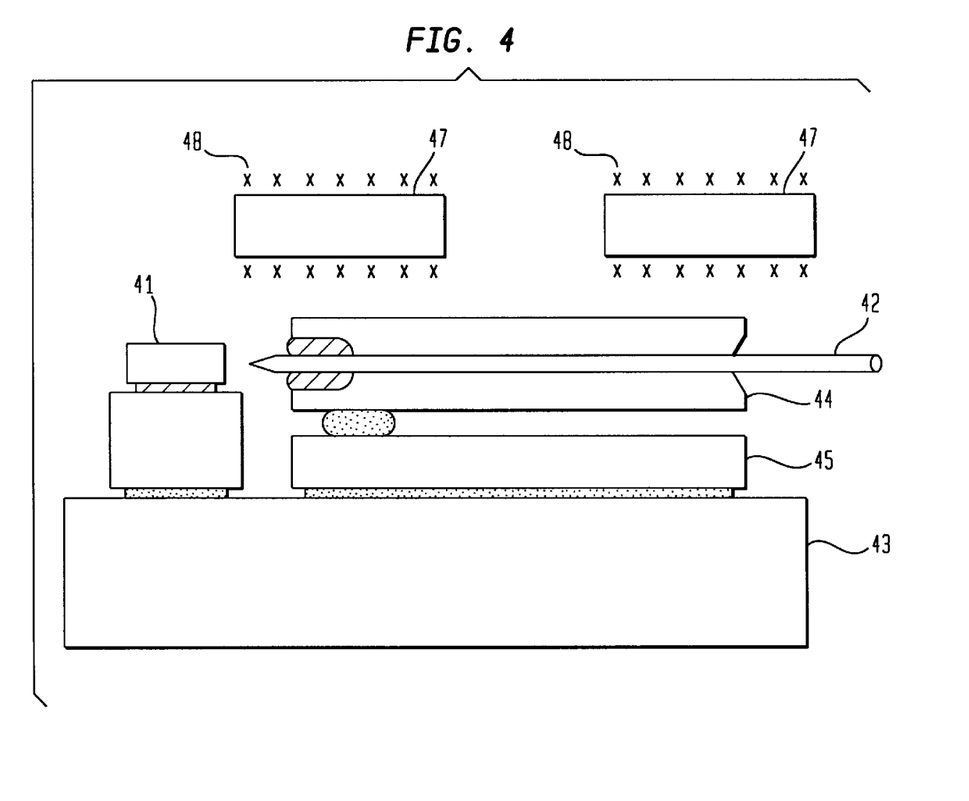
FIG. 4 illustrates a laser-to-fiber optoelectronic packaging system with alignment and solder bonding capability.

FIG. 4 is a schematic illustration of an optoelectronic packaging configuration wherein at least two optical components 41, 42 are to be optically aligned and permanently bonded to a substrate 43. Here, for example, optical component 41 can be a laser and optical device 42 can be an optical fiber. In general, either optical component can be selected from optical waveguides, laser devices, photodetectors, micro-optic chips, optoelectronic chips, liquid crystal devices or integrated optical devices. The mobile fiber 42 can be attached to a mobile magnet 44 as by a Kovar sleeve, and magnet 44 can be attached via stand-off 45 to substrate 43. The laser 41 can be attached to the substrate 43 via a heat spreader 46 such as a diamond body.

The device of FIG. 4 allows precise positioning of one of the optical components in relation to the other, e.g., the fiber 42 in alignment with the laser 41, before permanent bonding is carried out. The bonding can be by soldering, glass bonding or epoxying. The mobile magnet 44 attached to the mobile fiber 42 is moved in x, y or z directions by magnetic interactions with programmable magnets 47 disposed within solenoids 48, such as illustrated in FIG. 1(b).

If active alignment and feedback are utilized, the programmable magnets 47 can be selectively adjusted until the maximum optical coupling position is obtained. The maximum coupling position can then be secured by bonding of the mobile magnet onto the stand-off 45. The overall thermal expansion and contraction of the device package can also be considered in the magnetic positioning of the optical components so that the optical coupling is maximized after the bonding and subsequent cooling to the operating temperature.

The alignment devices can also be utilized for switching by intentional misalignment in the y or z direction, or increased gap in the x direction to obtain a desired level of attenuation of optical signals. The performance of such latchable optical attenuators depends on the combined, independent control of the programmable and latchable magnets.

Figure 5A:
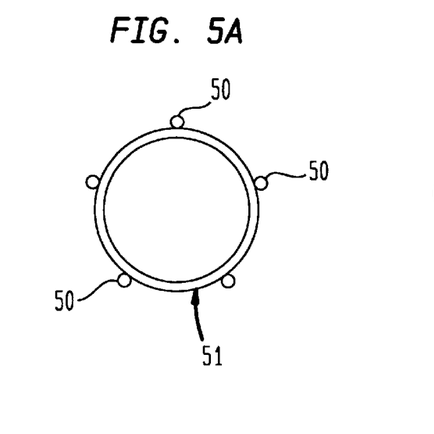
FIGS. 5(a)–(d) schematically illustrate 1×N optical switch systems.
Figure 5B:
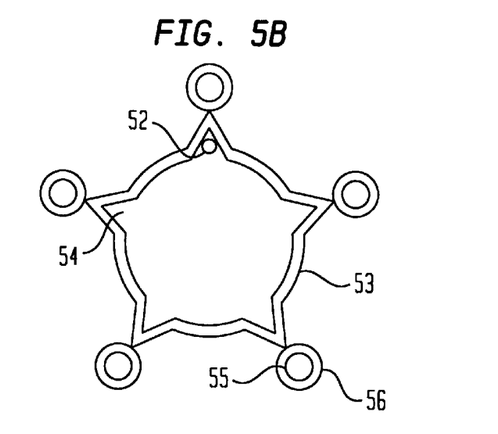

FIGS. 5(a)–5(d) illustrate latchable 1×N optical switches. FIGS. 5(a) and 5(b) represent end views of the two mating parts, respectively, of a 1×5 switch. In the operating device the ends depicted by FIGS. 5(a) and 5(b) are axially aligned in close conjunction. In the FIG. 5(a) mating half, five immobile fibers 50 are fixed onto a substrate 51. In the FIG. 5(b) half, mobile fiber 52 is attached to a mobile magnet such as a magnetic sleeve (not shown) which is magnetically soft, semi-hard or hard. Each mobile fiber 52 is placed inside a V-grooved tube 53, e.g., a metal, ceramic, glass or plastic tube with five V-grooves 54 for accurate positioning of fiber 52 if it is pulled into one of the grooves by magnetic attraction. At the outside of each V-groove 54, is a programmable and latchable magnet 55 (such as Fe—28Cr—7Co alloy described earlier) and an accompanying solenoid 56.

In operation, magnetization of a selected programmable magnet will attract the fiber 52 (via its attached mobile magnet) to the particular groove which is optically pre-aligned with one of the five immobile fibers 50. To shift the mobile fiber to another groove for optical switching, the programmable magnet 55 near the current fiber position is either demagnetized (as by gradually diminishing AC current) or is magnetized to an opposite polarity (if the mobile magnet has a remanent induction) while the programmable magnet near the new desired groove position is magnetized by a pulse current and latched to exhibit remanent magnetization after the power is removed. The solenoid 56 for each programmable magnet can be split into two independent axial sections (not shown) so that the two fibers are brought to near-contact for maximum optical coupling.

Figure 5C:
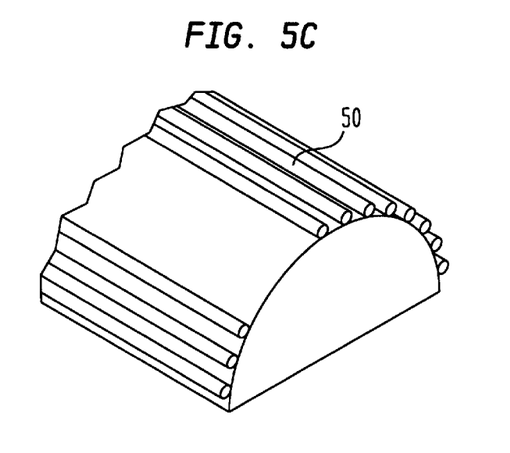
Figure 5D:
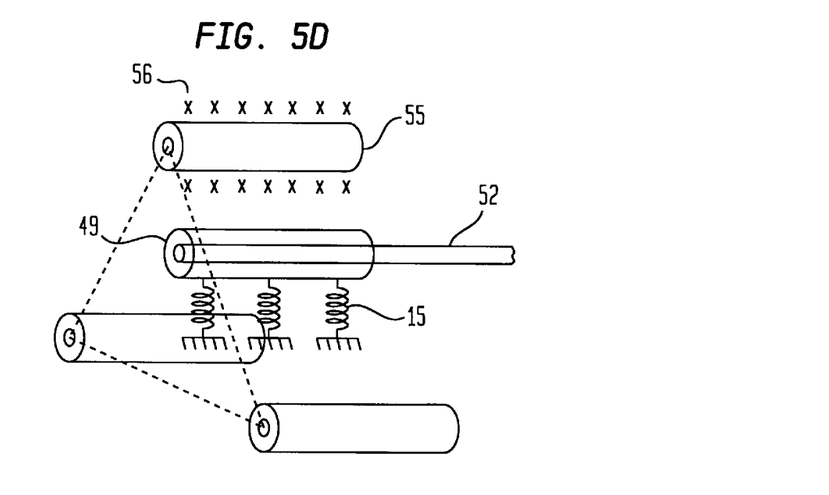

FIGS. 5(c) and 5(d) illustrate two mating parts of an alternative 1×N switch. In the FIG. 5(c) part, N immobile fibers 50 are spatially arranged, for example, in a semi-circular fashion. In the FIG. 5(d) mating part, the mobile fiber 52 (and the attached mobile magnet 49) is connected to a substrate (not shown) so that the mobile magnet 49 is moved maintaining the horizontal state. A plurality of programmable magnets 55 is provided for moving the mobile fiber 52 among the stationary fibers 50. Selective latching magnetization or unlatching demagnetization of the programmable magnets 55 results in the movement and position-latching of the mobile fiber 52 to a specific position, thus accomplishing the optical switching function. The programmable magnets 55 and the accompanying solenoids 56 can be split axially into pairs to additionally provide a lateral displacement.

Figure 6A:
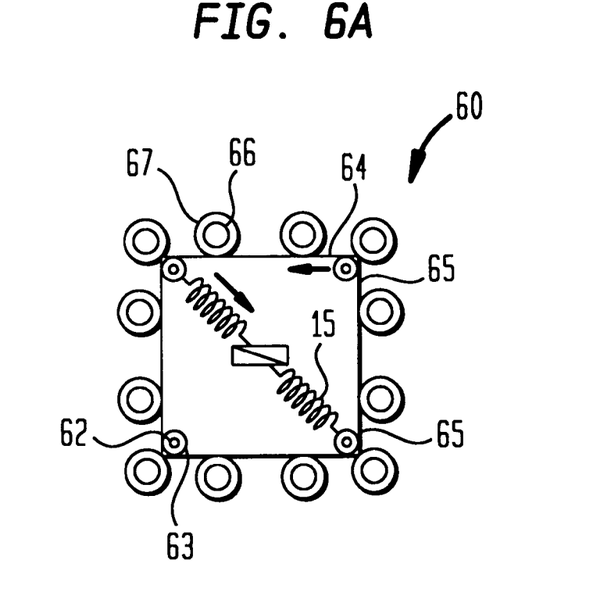
FIGS. 6(a) and (b) schematically illustrates a 4×4 optical cross-connect switch.
Figure 6B:
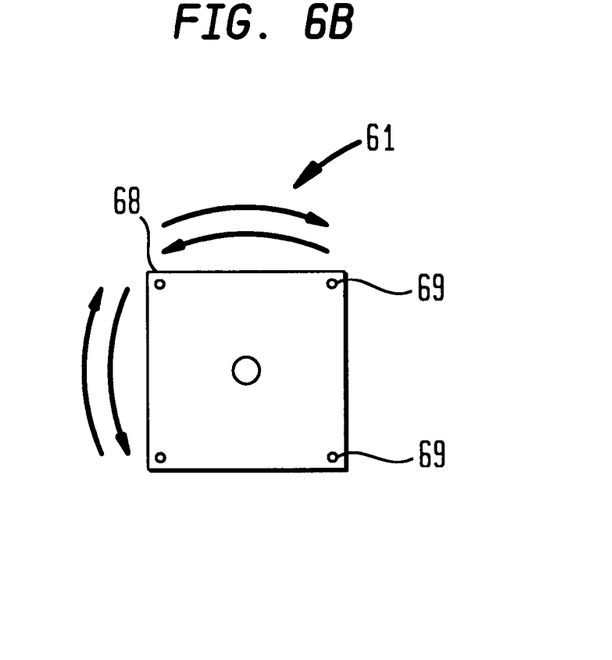

FIGS. 6(a) and 6(b) illustrate the two mating halves 60, 61 of an N×N optical switch (here 4×4). All the fibers 62 in mating half 60 are mobile, and each has a magnetic sleeve 63. The fibers are within a substrate such as a rectangular tube 64. Near the corners 65 (or V-grooves in larger switches) where the fibers can be moved and position-latched, programmable but immobile magnets 66 and accompanying solenoids 67 are placed. Magnets 66 attract or repel the mobile fibers depending on the relative magnetic polarity. Magnetization and demagnetization of selected magnets 66 in a proper sequence can move a selected fiber to a selected position to obtain N×N optical switching.

The second mating half 61 can be a corresponding rectangular support 68 which includes attached immobile fibers 69. Structure 68 is rotatably mounted so it can be rotated digitally by 90, 180 or 270 degrees. The rotation of mating half 61 permits different sets of fibers 62 and 69 to be cross-connected.

In operation, to move lower left fiber to the upper left corner, the upper left fiber is refracted by spring 15, e.g. by demagnetizing its magnetic sleeve and removing the attractive force from programmable magnet 67. The fiber in the lower left is then sequentially moved up.

Figure 7A:
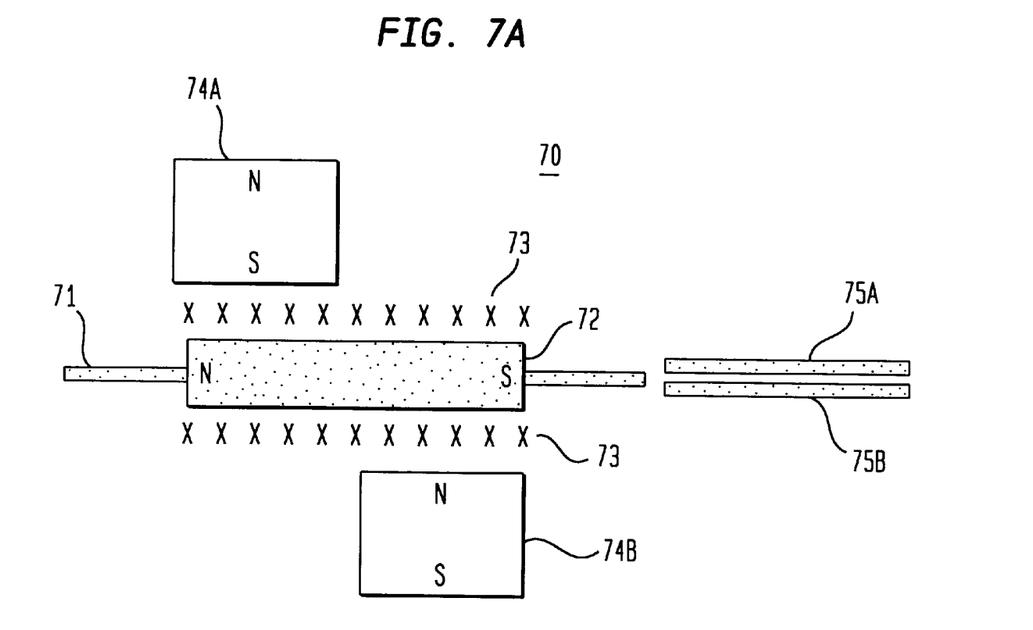
FIGS. 7(a) and (b) is an exemplary 1×2 magnetically latchable switch according to the invention.

FIG. 7(*a*) illustrates a magnetic switch 70 composed of an input fiber 71 attached to a mobile programmable and latchable magnet 72, an accompanying solenoid 73, and a plurality of immobile permanent magnets 74A, 74B. Switch 70 switches optical input fiber 71 between two output fibers 75A, 75B.

The input light signal is switched between two output fibers 75A and 75B, depending on the magnetization intensity and polarization of the programmable magnet 72. When the programmable magnet 72 is magnetized as shown, the magnet will rotate clockwise, coupling the light from the input fiber 71 to the output fiber 75B. If the programmable magnet 72 is magnetized in the opposite polarity, the magnet will rotate counterclockwise, coupling the light to fiber 75A.

Figure 7B:
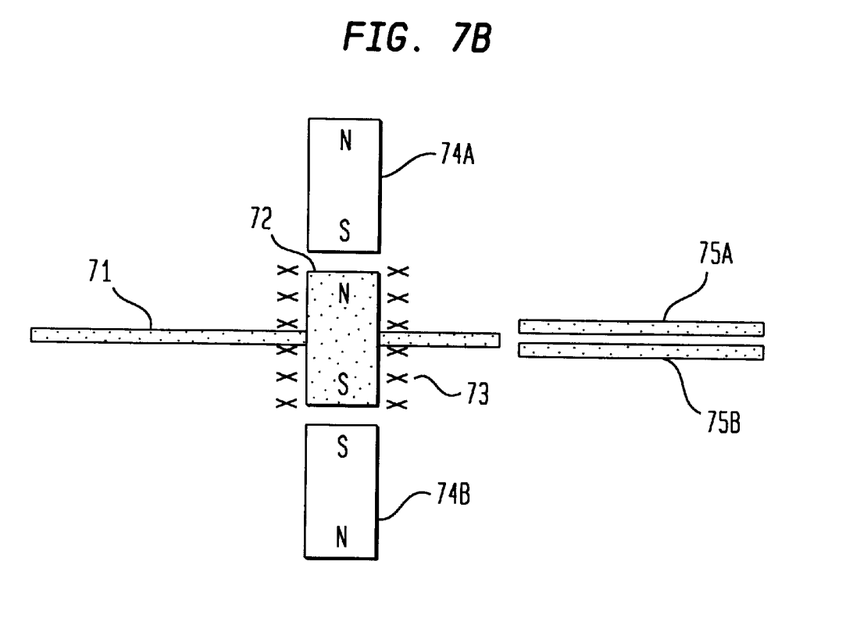

FIG. 7(*b*) illustrates a similar switch wherein the magnets 72, 74A and 74B are laterally aligned. Operation is controlled by movement of magnet 72 between 74A and 74B.

Instead of using two permanent programmable magnets 74A, 74B, one of them can be replaced with a mechanical spring which keeps the input fiber optically connected to a default output fiber, e.g., fiber 75A when the programmable magnet is not magnetized, demagnetized or oppositely magnetized. For improved accuracy of optical coupling, the fibers can be made to move into a V-groove or other guide configuration (not shown). Expanding the concept, a 1×N switch can be made by using N output fibers (e.g. 75A, 75B, ..., 75Y), and using intermediate values of magnetization in the programmable magnet so that the input fiber optically couple to a chosen output fiber.

Figure 8:
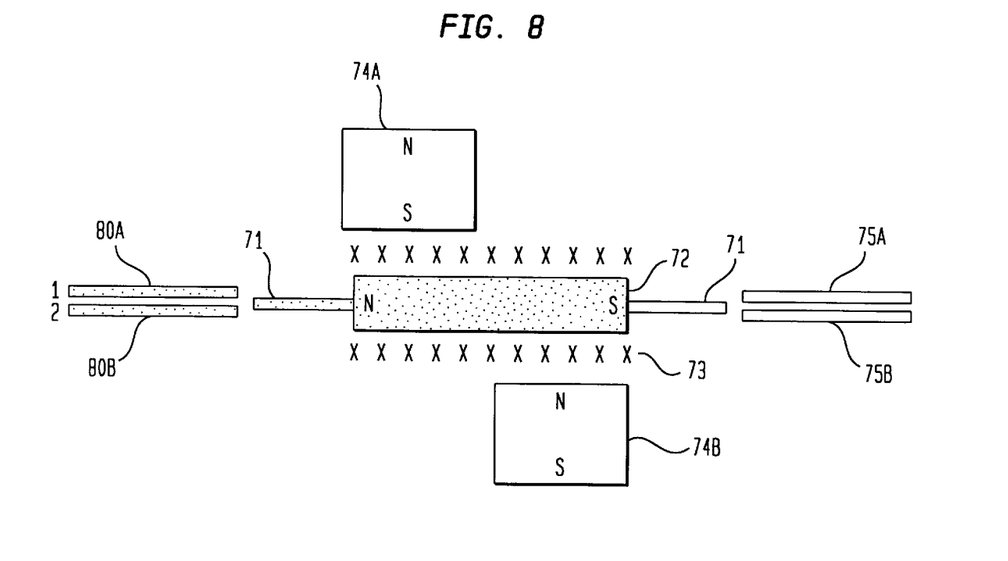
FIG. 8 is another embodiment of the 1×2 magnetic switch.

FIG. 8 shows a modification of the switching device to operate as a 2×2 switch. Here mobile fiber 71 can be moved to select between two separate input fibers 80A and 80B. In the magnetization polarity shown, the magnetic attraction force rotates the mobile fiber clockwise, coupling the light from input fiber 80A to the output fiber 75B. If the magnetic polarity is reversed, e.g., by changing the polarity of current sent to the solenoid, the magnetic repulsive force will rotate the fiber 71 counter-clockwise, coupling light from the input fiber 80B to the output fiber 75A.

Figure 9:
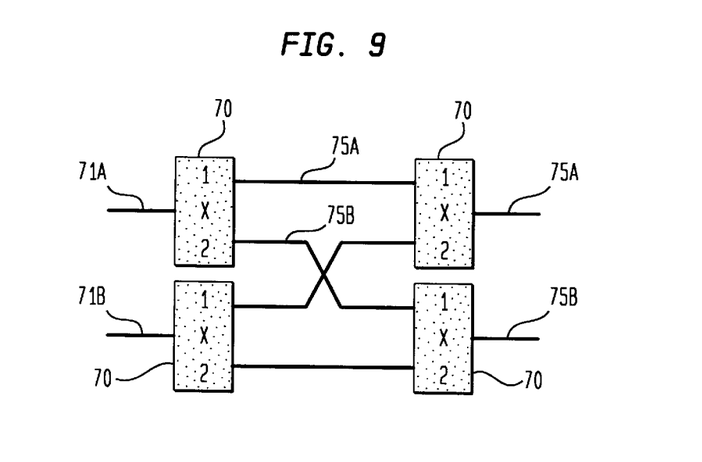
FIG. 9 shows an exemplary 2×2 magnetically latchable cross-connect.

FIG. 9 schematically illustrates an N×N magnetically latchable cross-connect (here 2×2) made up of a plurality of 1×2 optical switches 70. Input fibers 71A, 71B are switched between outputs 75A, 75B. Thus the 1×2 switches are building blocks for higher channel count cross-connects. The number of 1×2 switches needed scales as N×N. Such 1×N or N×N switches can be combined with wavelength channel routing devices, wavelength splitters, and/or channel add/drop devices to form an optical networking system in which any wavelength signal from any subset of input fibers can be transferred to any subset of output fibers.

In summary, it can now be seen that an optical connection device for aligning or deliberately misaligning optical components comprises at least two optical components, a movable magnet attached to at least one of the optical components and at least one programmable magnet for providing controllable movement of the movable magnet and thereby providing controlled displacement of the attached optical component in relation to the other optical component. The programmable magnet typically comprises a magnet and a solenoid. The programmable magnet is preferably latchable so that the displacement of the optical component is latchable. Typical optical components are optical fibers. They can also be planar optical waveguides, photodetectors, light emitting diodes, lasers, optoelectric devices, liquid crystal devices and integrated optical devices.

It is understood that the above-described embodiments are illustrative of only a few of the many possible specific embodiments which can represent applications of the invention. Numerous and varied other arrangements can be made by those skilled in the art without departing from the spirit and scope of the invention.

What is claimed is:

1. An optical connection device for aligning or deliberately misaligning optical components comprising:

at least two optical components;

a movable magnet attached to at least one of said optical components; and at least one programmable magnet for providing controllable movement of said movable magnet and thereby providing controlled displacement of the attached optical component in relation to the other optical component.

2. The connection device of claim 1 wherein said programmable magnet comprises a magnet and a solenoid for activating said magnet.

3. The connection device of claim 1 wherein the programmable magnet is latchable and the displacement of the optical component attached to the movable magnet is latchable.

4. The connection device of claim 1 wherein at least one of said optical components is an optical fiber.

5. The connection device of claim 1 wherein said two optical components are optical components to be bonded in alignment.

6. An optical attenuator according to claim 1.

7. An optical switch according to claim 1.

8. An optical cross-connect switch according to claim 1.

9. An optical connection device for aligning or deliberately misaligning optical components from among first set of optical components with optical components from a second set, comprising:

one or more movable magnets attached to optical components from said first set;

one or more programmable magnets for providing controlled movement of said movable magnets and thereby providing controlled displacement of the attached optical components in relation to optical components in said second set.

10. The optical connection device of claim 9 wherein said first set of optical components comprises a plurality of optical fibers.

11. The optical connection device of claim 9 wherein said first set of optical components comprises a plurality of optical fibers and said second set of optical components comprises a plurality of optical fibers.

12. The connection device of claim 1 wherein at least one of said optical components is an optical component selected from the group consisting of optical fibers, planar optical waveguides, photodetectors, light emitting diodes, lasers optoelectronic devices, liquid crystal devices and integrated optical devices.

\* \* \* \* \*